US005756998A

United States Patent [19]

Marks et al.

[11] Patent Number: 5,756,998

[45] Date of Patent: May 26, 1998

[54] PROCESS FOR MANUFACTURING COATED WIRE COMPOSITE AND A CORONA GENERATING DEVICE PRODUCED THEREBY

[75] Inventors: Gary T. Marks, Phelps; Joseph A. Swift, Ontario; Arun Varshneya, Alfred, all of N.Y.

[73] Assignee: Xerox Corporation, Stamford, Conn.

[21] Appl. No.: 785,106

[22] Filed: Jan. 21, 1997

[51] Int. Cl.[6] .......................... H01T 19/00; G03G 15/02; C03C 27/02

[52] U.S. Cl. .......................... 250/324; 65/59.6; 65/59.7; 65/59.28; 65/59.27; 427/175

[58] Field of Search .......................... 250/324; 65/59.6, 65/59.7, 59.28, 59.27; 427/175

[56] References Cited

U.S. PATENT DOCUMENTS

| | | | |
|---|---|---|---|
| 2,263,601 | 11/1941 | Wendler | 65/59.6 |
| 3,791,172 | 2/1974 | Manfre et al. | 65/11 W |
| 3,890,127 | 6/1975 | Siegmund | 65/12 |
| 4,227,234 | 10/1980 | Seanor et al. | 361/229 |
| 4,801,324 | 1/1989 | Hyland | 65/3.11 |
| 5,006,671 | 4/1991 | Boeke | 174/125.1 |
| 5,240,066 | 8/1993 | Gorynin et al. | 164/461 |

*Primary Examiner*—Jack I. Berman
*Attorney, Agent, or Firm*—Denis A. Robitaille

[57] ABSTRACT

An improved process for manufacturing glass coated wire, for example, a corona generating electrode having a dielectric coating layer of the type used in electrostatographic printing applications, wherein predetermined stresses are induced along the axial, radial, and hoop stress vectors present in the dielectric coating. In accordance with the present invention, there is provided a process for manufacturing a coated wire composite including a core wire having a coating layer of dielectric material thereon, comprising the steps of: providing a preform of dielectric coating material in a cylindrically tubular shape defining an inside diameter and an outside diameter and having a predetermined length; aligning a continuous length of the core wire with the inside diameter of the preform for transporting the wire therethrough in a coaxial arrangement such that the wire enters the preform at an entrance orifice and exits the preform at an exit orifice; applying heat to the preform for melting a portion of the preform in the proximity to the exit orifice for providing molten dielectric material in contact with the core wire such that a portion of the molten dielectric material is caused to collapse onto and bond to the core wire; and cooling the molten dielectric material on the core wire to resolidify the dielectric material to form the coated wire composite including a core wire having a coating layer of dielectric material. An additional process parameter for inducing selected radial and hoop stresses in the coating layer is also disclosed.

11 Claims, 2 Drawing Sheets

PROCESS FOR MANUFACTURING COATED WIRE COMPOSITE AND A CORONA GENERATING DEVICE PRODUCED THEREBY

The present invention relates to a process for manufacturing a coated wire composite including a conductive core wire covered with a coating of dielectric material such as glass and, more particularly, is directed toward an improved process for making glass coated wire composites for use in corona generating devices of the type utilized, for example, in electrostatographic printing machines.

Thin metal wires coated with glass, glass-ceramic, or other dielectric materials have been shown to have many different uses in various fields of technology, for example: in the electrical and electronic fields, as conductors, microthermocouples, resistors, and heaters; in the medical field as micro-electrodes; and in the field of composite materials as reinforcing elements and as conductors of electricity and/or heat in ceramic masses. In one specific application, glass coated wire composites have been shown to be useful in corona generating devices, as used in various technologies that require the generation of ions to produce certain gases or to create electrostatic charges.

In particular, a typical electrostatographic printing system utilizes a corona generating device for depositing an initial uniform electrostatic charge on a photoconductive surface. This charge is subsequently selectively dissipated by exposure to an optical signal for creating an electrostatic latent image on the photoconductive surface which may then be developed and the resultant developed image can be transferred to a copy substrate, thereby producing a printed output document. Such corona generating devices are also utilized in electrostatographic printing applications to perform a variety of other functions, such as: transferring the developed image to the output copy substrate; electrostatically tacking and de-tacking the copy substrate with respect to the photoconductive surface; conditioning the image bearing photoconductive surface prior to, during and after development of the image thereon to improve the quality of the output image; and cleaning of the photoconductive member.

Of particular interest with respect to the present invention, is a so-called "dicorotron" type of corona generating device, as first disclosed in U.S. Pat. No. 4,086,650, issued to Davis et al. A dicorotron comprises a corona generating electrode member located adjacent a conductive shield, wherein the electrode member is a thin conductive wire coated with a dielectric material, preferably glass. Davis et al. found that the use of a glass coated corona generating electrode solved many problems associated with prior art corona charging devices utilizing an uncoated thin wire electrode. Most significantly, the charge deposited by a glass coated wire corona generating device is substantially more uniform than the charge deposited by bare wire corona generating devices.

Methods for obtaining metal wires covered with glass are well known in the art (See, for example, French Pat. No. 1,452,979, and U.S. Pat. Nos. 3,214,805, and 3,256,584). In general, these processes involve heating the glass to a molten state to coat a metal wire. In some processes, heating is obtained via electromagnetic induction to melt the metal wire which, in turn, softens the glass located in contact therewith. It has been found that manufacturing methods of this nature are very difficult to control, resulting in significant problems associated with the production of continuous lengths of coated metal wire composites. In addition, it is difficult, and in some instances even impossible, to obtain continuous coated metal wires of uniform diameter using conventional methods.

It has also been noted in the prior art that corona discharge electrodes of the type having a dielectric material, such as glass, coating a conductive inner core member typically suffer substantial failures due to external forces to which the coated wire is subjected during handling and the like and are also characterized by relatively short operating lives. In U.S. Pat. No. 4,227,234, it was brought to light that glass coated corona discharge electrodes are able to withstand a higher tensile load than conventional glass coated corona generating electrodes by placing an axial compressive stress in the dielectric coating. As a result, that patent discloses a process for manufacturing glass coated corona charging elements having the glass coating in a compressed state along the longitudinal axis of the electrode. The process of that patent forms a molten glass coating on the corona discharge electrode while the electrode is placed under tension, with the tension being subsequently released after the molten material is allowed to cool and become bonded to the electrode. This process yields a corona generating electrode that can be strung in a support frame under relatively high loads, thereby minimizing vibrations which are sometimes associated with the operation of such corona generating devices. The reduction of vibration enhances charge uniformity by reducing the transitory variation of charge density laid down upon a substrate which can result from the temporary variation in electrode/substrate spacing.

The present invention is directed toward an improved method of manufacturing glass coated wires by modifying not only axial stresses in the glass coating, as disclosed by U.S. Pat. No. 4,227,234, but by also modifying and inducing predetermined stresses in the glass coating along the other two stress vectors present in a circular configuration, namely: radial stress; and hoop stress vectors. By properly inducing selected stresses along these other two vectors, the mechanical durability of the glass coating can be enhanced without undue fortification of the glass to metal bond so as to allow for the glass removal for the purposes of mounting and electrical connection necessary in a corona generating device. The present invention also introduces an additional process step directed toward the application of vacuum pressure for controlling the region of contact between molten glass and wire in a critical aspect of the manufacturing process. The following disclosures may be relevant to some aspects of the present invention:

U.S. Pat. No. 3,789,278 Patentee: Bingham et al. Issued: Jan. 29, 1974

U.S. Pat. No. 3,791,172 Patentee: Manfre et al. Issued: Feb. 12, 1974

U.S. Pat. No. 3,890,127 Patentee: Siegmund Issued: Jun. 17, 1975

U.S. Pat. No. 4,227,234 Patentee: Seanor et al. Issued: Oct. 7, 1980

U.S. Pat. No. 4,598,018 Patentee: Beuscher Issued: Jul. 11, 1986

U.S. Pat. No. 4,801,324 Patentee: Hyland Issued: Jan. 31, 1989

U.S. Pat. No. 5,006,671 Patentee: Boeke Issued: Apr. 9, 1991

U.S. Pat. No. 5,240,066 Patentee: Gorynin et al. Issued: Aug. 31, 1993

The relevant portions of the foregoing patents may be briefly summarized as follows:

U.S. Pat. No. 3,789,278 discloses a negatively biased corona discharge including a conductive electrode having a thin inorganic dielectric outer layer bonded thereto which is employed as a corona discharge electrode. The discharge system is utilized for uniformly placing a negative charge on an insulator substrate such as an electrophotographic imaging surface. The coating on the electrode acts to suppress the widely spaced emission nodes common to all negatively biased metal corona discharge electrodes. The coated electrode may, therefore, be placed in close proximity to the substrate which it is charging and operated at low emission densities without sacrificing charge uniformity thereby reducing the power requirement of the corona discharge system.

U.S. Pat. No. 3,791,172 discloses an apparatus for coating a wire with glass or the like, having a means for moving a metal rod and a glass tube thereabout, along the same path independently of each other, and into a heating means. The apparatus comprises rollers for gripping and moving the rod and a worm screw for gripping the tube, wherein the rollers and carriage are driven by independent drive means. A device for heating the metal rod is provided with a truncated conically shaped crucible heated electrically as a resistor. Means for cooling the coated wire drawn from the mass of metal and glass in the crucible is also provided.

U.S. Pat. No. 3,890,127 discloses the heating and drawing of bundles of optical fibers under superatmospheric pressure to avoid the formation of gas bubbles within the fibers to eliminate blemishing caused by their inclusions in components drawn from the bundle. An apparatus is provided within which heating and drawing of the bundle of optical fibers is accomplished in a pressure chamber while the component being drawn therefrom is continuously removed from the chamber through a fluid seal.

U.S. Pat. No. 4,598,018 discloses an electrical wire for use in high temperature applications made by providing refractory fibers that are larger than one micron in diameter and made of nonmetallic mineral material that has a melting point greater than 1200° F., and applying the fibers and a binder to an electrically conductive core, to form an insulating coating around the core.

U.S. Pat. No. 4,227,234, described briefly hereinabove, discloses corona discharge electrodes coated with compressed dielectric materials. A corona discharge electrode is placed under tension and coated with a molten, viscous dielectric material, such as glass, while under tension. The dielectric material is allowed to cool so as to become bonded securely to the corona discharge electrode. Thereafter, the tension upon the corona discharge electrode is released, thereby causing compression of the dielectric material adhered thereto such that the resulting dielectric coated corona discharge electrode has a substantially improved life and delivers substantially uniform currents.

U.S. Pat. No. 4,801,324 discloses a method of manufacturing high quality optical fiber for telecommunications, wherein a preform is advanced towards a furnace until a tip detector automatically stops the preform at a predetermined position in front of the furnace to provide a reference datum for a second mode of operation in which a computer can be initiated manually to advance the preform by a predetermined amount into the furnace to commence drawing the optical fiber.

U.S. Pat. No. 5,006,671 discloses a glass-clad wire of ceramic superconductive material produced by filling a glass-lined cylinder with a powder of superconductive material, sealing the cylinder ends and drawing the filled, sealed cylinder through dies of progressively smaller size until a predetermined wire size is achieved. The formed wire is then heat treated to assure necessary crystallinity in the superconductor material. Removal of an outer metal coating yields a glass-clad superconductor wire.

U.S. Pat. No. 5,240,066 discloses a method for preparing glass-coated microwires, wherein a metal in a glass tube is superimposed in a high frequency induction field, whereby the glass tube softens. A thin capillary tube is drawn from the softened glass and the glass tube fills with molten metal. The metal-filled capillary enters a cooling zone in the superheated state and the rate of cooling is controlled such that a microcrystalline or amorphous metal microstructure is obtained. The cooling zone includes a stream of cooling liquid through which the capillary passes. The microstructure of the microwave is controlled by choice of amorphisizers, cooling rate, nature of the selecting cooling liquid, location of the cooling stream, dwell time in the cooling stream and degree of superheating and supercooling of the metal.

In addition, an article authored by one of the named inventors herein, Dr. A. K. Varshneya, entitled "Stresses in Glass-to-Metal Seals", published in Treatise in Materials Science and Technology at Vol. 22: Glass III, © 1982, provides a thorough discussion of the stresses present in glass sealed over a metal wire in a concentric cylinder geometry. Reference is also made to an article authored by L. Rongved, C. R. Kurkjian and F. T. Geyling, entitled Mechanical Tempering of Optical Fibers, published in The Journal of Non-Crystalline Solids, Vol. 42, page 579 © 1980 a (later corrected via a "letter to the editor" authored by A. K. Varshneya, Deepak Varshneya and Vijay Jain, published in Vol. 93 of the same Journal of Non-Crystalline Solids, © 1987).

In accordance with one aspect of the present invention, there is provided a process for manufacturing a coated wire composite including a core wire having a coating layer of dielectric material thereon, comprising the steps of: providing a preform of dielectric coating material in a cylindrically tubular shape defining an inside diameter and an outside diameter and having a predetermined length; aligning a continuous length of the core wire with the inside diameter of the preform for transporting the wire therethrough in a coaxial arrangement such that the wire enters the preform at an entrance orifice and exits the preform at an exit orifice; applying heat to the preform for melting a portion thereof in proximity to the exit interface orifice for providing molten dielectric material thereat, whereby a portion of the molten dielectric material is caused to collapse onto the core wire and bond thereto; and cooling the molten dielectric material on the core wire to resolidify the dielectric material to form the coated wire composite including a core wire having a coating layer of dielectric material thereon.

In accordance with another aspect of the present invention, there is provided a corona generating electrode of the type used in electrostatographic printing applications, wherein a conductive core wire is coated with a layer of dielectric material, said layer of dielectric material including predetermined stresses along the axial, radial, and hoop stress vectors thereof, wherein the corona generating electrode of the present invention is manufactured in accordance with the process described hereinabove.

Additional and other aspects of the present invention will become apparent as the following description proceeds and upon reference to the drawings, in which.

Figure 1:
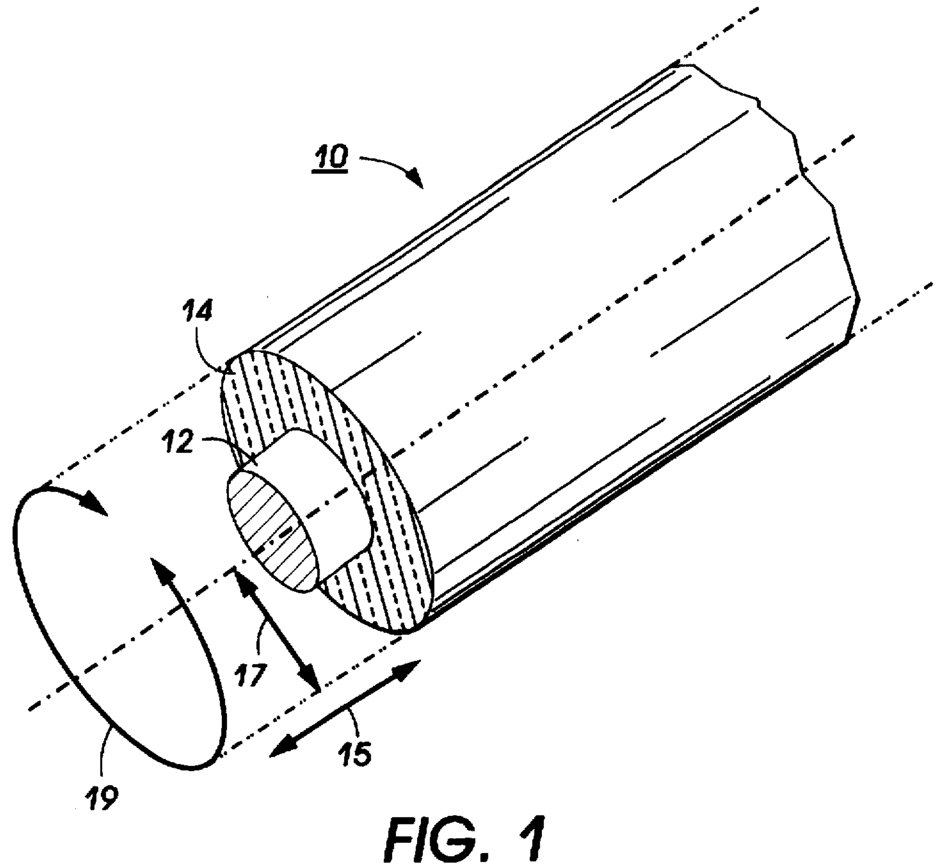
FIG. 1 is a perspective, sectional view of a glass coated corona generating electrode manufactured in accordance with the present invention.

For a general understanding of the features of the present invention, reference is made to the drawings, wherein like reference numerals have been used throughout to designate identical elements. It will become apparent from the following description that the manufacturing process and article manufactured thereby in accordance with the present invention may be equally well-suited for use in the manufacture of a wide variety of coated wire composites and is not necessarily limited to the manufacture of the particular corona generating electrode described herein. Moreover, while the manufacturing process of the present invention will hereinafter be described in connection with a preferred embodiment thereof, it will be understood that the description of the invention is not intended to limit the invention to this preferred embodiment. On the contrary, the description is intended to cover all alternatives, modifications, and equivalents as may be included within the spirit and scope of the invention as defined by the appended claims.

Referring initially to FIG. 1, a coated wire composite 10 of the type used in a dicorotron-type corona discharge electrode is shown, comprising a core wire 12, in the form of an inner conductive electrode, and a relatively thick coating 14 of dielectric material coated thereon. FIG. 1 also shows, in diagrammatic form, the stress vectors present in a circular composite configuration, namely: an axial stress vector 15 extending along a plane parallel to the axis of the electrode; a radial stress vector 17 extending in a plane transverse to the axis of the electrode; and a so-called hoop stress vector 19, circumscribing the axis of the electrode. It will be understood that stresses occur when the orientation of forces along a particular vector are present in divergent directions: forces acting against one another amount to compressive stress or compression; while forces acting away from one another amount to tensile stress or tension.

An exemplary device in which a corona discharge electrode of the type illustrated in FIG. 1 may be used is described in U.S. Pat. No. 4,086,650, which describes a corona discharge device including a corona generating electrode coated with a relatively thick dielectric material. In the context of corona generating device applications, the dielectric coating materials which may be used to coat the inner conductive electrode must be chemically inert and not susceptible to chemical reaction by reactive species, such as ozone gas, which are produced by electrical discharge in the atmosphere. Furthermore, the dielectric coating material should: have a high dielectric breakdown strength; be free of voids; firmly adhere to the inner conductive electrode element both under static and dynamic conditions; and be capable of withstanding stress loadings of 10,000 p.s.i. or greater.

Various glass and ceramic materials are available which meet these stated criteria so as to be suitable for use as in coating the inner conductive electrode. Typical and exemplary glasses include silica glass, alkali silicate glass, soda-lime glasses, borosilicate glass, aluminosilicate glass, and lead glass. One exemplary glass which may be used in accordance with the present invention is designated under glass code 1720, available from Corning, Inc. of Corning, N.Y., and contains (by weight) 62% $SiO_2$, 17% $Al_2O_3$, 5% $B_2O_3$, 1% $Na_2O$, 7% MgO and 8% CaO. Another typical glass is designated glass code 1724, also available from Corning, Inc., containing Silica Oxide, Alumina Oxide, Boron Oxide, Barium Oxide, Calcium Oxide and Magnesium Oxide, as well as other trace compounds. Other glasses may be formed from $B_2O_3$, $GeO_2$, $P_2O_5$, $As_2O_5$, $P_2O_3$, $As_2O_3$, $Sb_2O_3$, $B_2O_5$, $Nb_2O_5$, $Sb_2O_5$ and $Ta_2O_5$. It will be understood that various alternative glasses or other dielectric materials may be selected by one skilled in the art for the particular desired application and environment in which the coated wire composite is to be used. Some exemplary ceramic materials which are suitable for use as the dielectric coating material in accordance with the present invention include the silica ceramics, feldspar ceramics, nepheline syenite ceramics, lime ceramics, magnesite ceramics, dolomite ceramics, chromite ceramics, aluminum silicate ceramics, magnesium silicate ceramics, and the like. It is noted that it has been found that inorganic dielectric materials may perform more satisfactorily than organic dielectrics in corona generating applications due to their higher voltage breakdown properties and greater resistance to chemical reaction in the corona environment.

The inner conductive electrode, on the other hand, designated by reference numeral 12 in FIG. 1, may be made of any conventional conductive filament materials. Exemplary conductive filament materials include stainless steel, gold, aluminum, copper, tungsten, platinum, molybdenum, tungsten/molybdenum alloy, carbon fibers, and the like. The conductive filament material preferably has a tensile strength in excess of about 50,000 p.s.i. (3,500 kg/cm$^2$) and more preferably a tensile strength in excess of 90,000 p.s.i. (6,300 kg/cm$^2$). Generally, conductive filament materials may have a tensile strength from about 50,000 p.s.i. (3,500 kg/cm$^2$) to about 340,000 p.s.i. (23,200 kg/cm$^2$). The diameter of the inner conductive electrode, typically a monofilament wire of any of the conventional conductive filament materials, is not critical and may vary typically between about 0.003 inches to about 0.015 inches and preferably is about 0.004 inches to about 0.006 inches. Multifilament core wires may also be used. Preferred inner conductive electrodes are made from monofilament tungsten wire or monofilament molybdenum wire. In one particular embodiment a triple electropolished monofilament core wire, available from Osram Sylvania Co. is preferred, wherein electropolishing is desirable to reduce draw marks during the manufacturing process, thereby minimizing abnormalities on the wire surface. Cleaning the wire surface by electropolishing or any other process, provides enhanced surface topography which, in turn, permits enhanced control of the adhesive forces present at the glass-to-wire interface. Clearly, the wire 12 should be free of flaws such as axial fractures or other defects that may contribute to breakage below normal tensile stresses.

A typical corona discharge member as used in electrostatographic printing applications is supported in a conventional fashion at the ends thereof by insulating end blocks mounted within the ends of a shield structure. Such a mounting means is described in U.S. Pat. No. 4,086,650. When mounted in such a fashion, the corona discharge member is generally placed under a small amount of tension in order to prevent the corona discharge member from sagging during the generation of the corona so as to maintain the normally flexible corona discharge member at a precisely fixed position between the support members.

Typically, portions of the glass coating must be removed from opposing ends of the electrode in order to facilitate mounting of the electrode in the end blocks, as well as to permit electrical connection of the inner conductive electrode to a biasing source or the like.

As previously noted, at least one prior art process for manufacturing glass coated corona discharge members, in particular U.S. Pat. No. 4,227,234, has disclosed that it is preferable that the outer dielectric coating be in a state of compression along the direction of the longitudinal axis of the electrode i.e., along axial vector 15, when the corona discharge member is in a completed form, that is, when the corona discharge member has been produced or manufactured and is at rest outside of the manufacturing machine. Indeed, it is preferable that such axial compression be maintained when the coated electrode composite is positioned in the shield or other support structure in which the electrode is mounted. The referenced patent asserts that such axial compression of the dielectric material results in an improved device by enhancing the delivery of a substantially uniform charge while improving the life of the corotron device.

In the context of a dielectric coated electrode, as described herein, it has previously been shown that compression along the axial direction can be achieved by placing the core electrode member under tension while it is being coated with a molten dielectric material, and subsequently releasing the tension after the dielectric material has been allowed to cool sufficiently to become securely bonded to the core electrode. The present invention advances the teaching of the prior art by examining the other stress vectors present in the dielectric material coating of the wire composite, namely radial and hoop stresses, and by defining factors that can be controlled to influence and induce controlled selected stresses along these stress vectors. Thus, although it is known that axial stress is a critical property in manufactured coated wire composites, one aspect of the present invention is directed to the additional control of radial and hoop stresses which may further impact product life and performance, as well as product yield during the manufacturing process as well as overall product quality.

Figure 2:
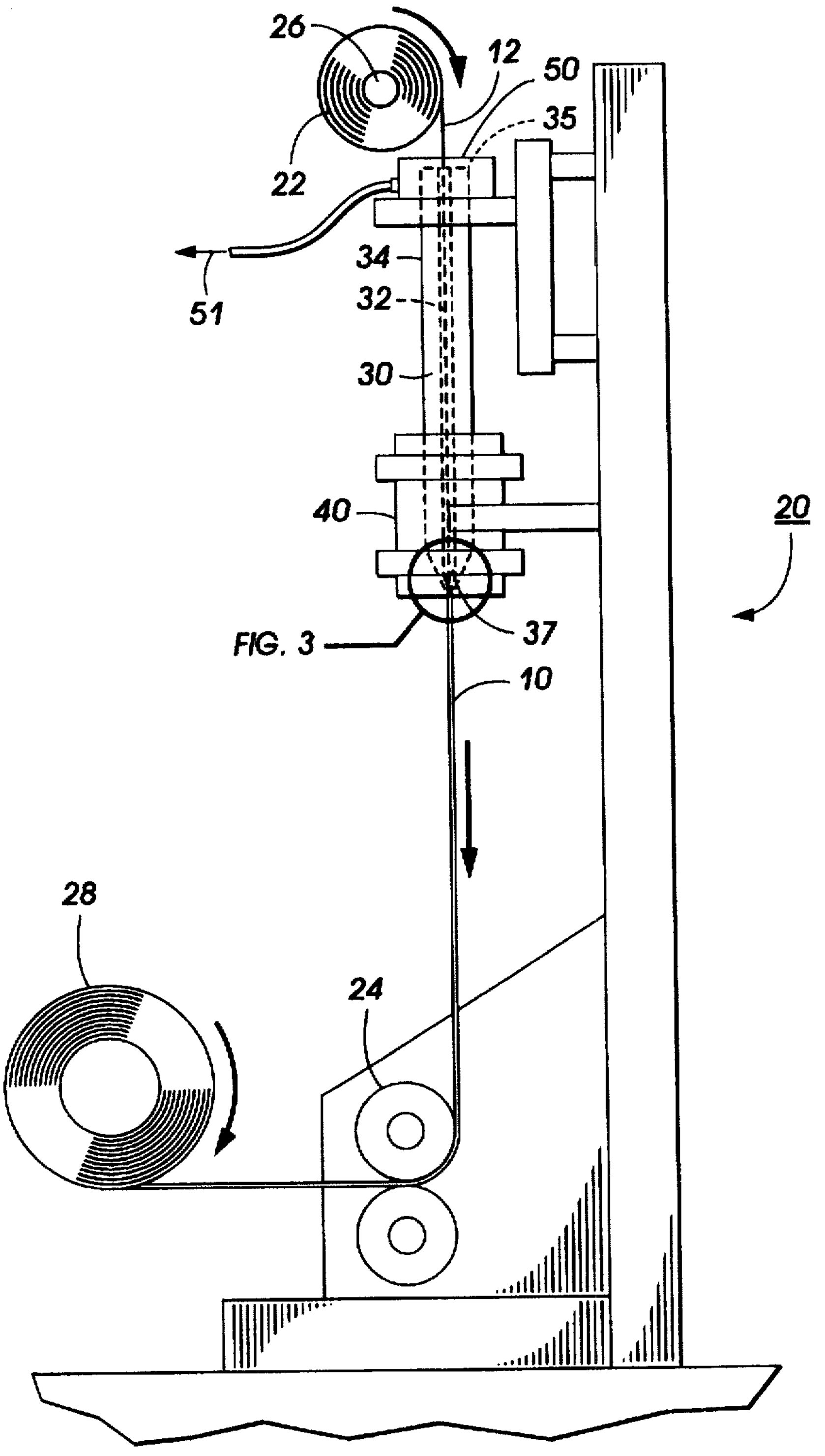
FIG. 2 is a diagrammatic illustration of an apparatus for producing a glass coated wire composite in accordance with the manufacturing process of the present invention.

Moving now to FIG. 2, an apparatus for the mass manufacture of continuous lengths of glass coated wire is shown in schematic form in order to illustrate the method of the present invention. The apparatus of FIG. 2 is a modified adaptation of an optical fiber manufacturing apparatus or so-called "fiber drawing tower" as shown in *Fundamentals of Inorganic Glasses*, Dr. Arun K. Varshneya, FIG. 20–22, p. 540, ©1993, Academic Press, Inc., and commonly used in the manufacture of small diameter optical fibers used in the telecommunications industry as well as other technological fields. The modified drawing tower of FIG. 2, generally identified by reference numeral 20, includes a feedspool 22 for providing a supply of fine core wire 12 in a relatively long continuous length, generally on the order of 5,000 to 10,000 feet or greater. The feedspool 22 is situated so as to permit alignment and passage of the wire 12 through an extended length of glass or other selected dielectric material in a coaxial arrangement. The coating material 14 is provided in the manner of a so-called "preform" arrangement 30, characterized by a hollow tubular cylinder having an outside diameter 34 and an inside diameter 32 sufficiently large to permit unobstructed passage of the core wire 12 therethrough. Thus, the preform 30 includes an entrance orifice 35 for receiving the wire 12, and an exit orifice 37 for permitting the departure of the wire 12 from the inner diameter 32 of the preform, whereby the wire 12 may be transported through the preform 30, for example, via an independently driven take-up spool 28.

Figure 3:
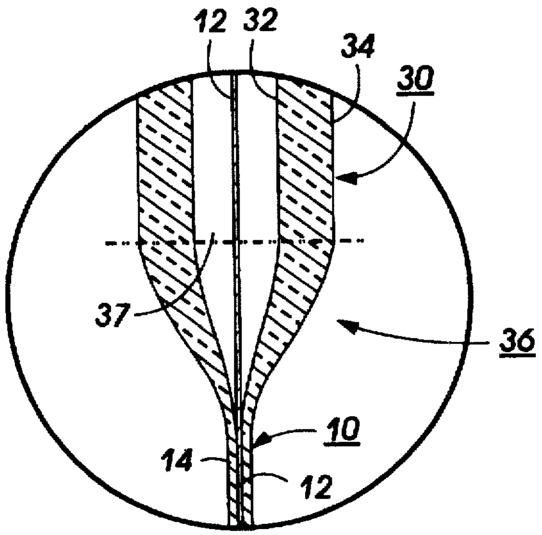
FIG. 3 is an exploded view of the region of contact between the core wire and molten glass in accordance with the manufacturing process of the present invention.

In order to coat wire 12 with the dielectric coating of the preform 30 so as to form a coated wire composite wherein the dielectric material is bonded to the wire 12, tower 20 also includes an annular furnace 40 adapted to receive a portion of the preform 30. An exemplary furnace that has been shown to be suitable for the manufacturing process of the present invention is the Model S-11-A, manufactured by Centor Vacuum Industries of Nashua, N.H., wherein the primary specification for the furnace is the capability for heating and melting the dielectric material making up preform 30 in the vicinity of the exit orifice 37, such that the dielectric coating material is transformed to a molten state thereat. Reference is made to FIG. 3, wherein an enlarged view of the region of contact between the molten dielectric material and the wire 12 is shown. It will be understood that the molten material becomes at least partially viscous so as to collapse onto the surface of the wire 12, as shown at reference numeral 36, as the wire is transported through the preform 30 such that a small amount of the viscous dielectric material is carried away with the wire 12 to produce a uniform coating layer of molten dielectric material thereon. Thereafter, the wire 12, having molten material coated thereon, exits the furnace 40 and the molten material is allowed to cool, by exposure to ambient air or any other gas, fluid or cool air supply (not shown) as may be provided, causing the dielectric material to resolidify on the wire 12 to produce a coated wire composite 10 in accordance with the configuration as shown in FIG. 1.

A critical process area of the glass coating method described hereinabove involves the region at which the molten glass initially contacts the moving wire: that region which is shown in enlarged cross-sectional view at FIG. 3. In accordance with the present invention, it has been determined that it may be beneficial to manipulate or control the viscous molten glass in this region so that the area of contact between the molten glass and the wire may be selectively varied. For example, it may be desirable to selectively vary the linear dimension of this region of interface to lengthen the zone of contact between the molten glass and the moving wire for enhancing or otherwise manipulating the adhesion therebetween. Similarly, it may be desirable to precisely locate the region of contact within a specific position within the furnace 40 in order to, for example, increase the process speed at which the manufacturing process can be carried out. As such, the present invention contemplates an additional process step directed toward controlling the shape and/or position at which the molten dielectric material 36 contacts the moving wire 12 in the region proximate to the exit orifice 37.

Thus, in a alternative embodiment, with respect to the apparatus of FIG. 2, the draw tower 20 is further provided with a vacuum source identified by reference numeral 50, generally located at the entrance orifice 35. Vacuum source 50 is coupled to the preform 30 via a suitable sealable coupling device so as to apply negative air pressure 51 to the inside diameter 32 of the preform 30 while allowing passage of wire 12 therethrough in a manner as previously described. Preferably, the vacuum source 50 can be adjusted to provide variable negative pressure to the molten glass in the region of contact with the wire 12, thereby permitting the manipulation and control of the viscous molten glass in this region in a manner as may be suitable to provide a desirable result. It will be understood that the presently described vacuum source arrangement represents only one of various ways in which the molten glass/wire interface may be manipulated and that various vacuum arrangements, as well as other methods, may be utilized to provide the desired manipulation and control of the molten glass/wire interface. For example, positive air pressure could be applied via vacuum source 50, wherein a mixture of gasses could be put to use to vary the gas composition at the molten glass/wire interface to selectively control oxidation levels thereat. This permits control of the wire oxide valence and thickness which create the actual bond with the dielectric material. Alternatively, selective variation of the oxidation level or oxide layer can be achieved via cleaning and/or chemical treating the wire 12 prior to entrance into the preform 30. Such pretreatment can be accomplished via spray cleaning, emersion cleaning, or electropolishing and may be carried out either at the tower 20 via a pretreatment station (not shown), or at an off site location, such as the wire manufacturer, as is the case in the use of the triple electropolished transfer wire previously discussed.

Moving on to various details of the present invention, it is noted that the dimensions of preform 30, as well as the process speed of the coating operation, are specifically predetermined to assure coverage of the entire preselected length of wire 12 provided by feedspool 22, and to yield a coated wire composite 10 with a coating having a specific predetermined thickness. In this regard, it is noteworthy that it has been found that the optimum preform dimensions, with respect to the inside and outside diameters thereby, should be selected to maintain an equivalent ratio of inside to outside diameter in the finished composite wire product. For example, in one suitable processing embodiment, perform 30 is provided in a length of 4 to 8 feet, having an inside diameter of approximately 0.222 inches and an outside diameter of approximately 0.5 inches, in order to provide a 0.0025 inch coating layer on a 0.004 inch diameter wire such that the coated wire composite has a total diameter of 0.009 inches.

As previously noted, a particular and important aspect of the process in accordance with the present invention is directed toward inducing controlled residual stresses resident in the coating layer 14 of wire composite 10. In particular, it has been identified in the prior art that compressive stress along an axial stress vector of the coating material is desirable, as specifically observed in previously referenced U.S. Pat. No. 4,227,234. To that end, it is noted that compressive stress along the axis of the coated wire composite 10 may be attained by any of various well-known techniques. For example, since the coated wire composite pertains to, in essence, a laminated material comprising an inner element and an outer element coated thereon, axial compression can be easily attained by various lamination techniques such as, for example, surface crystalization in the case where the dielectric coating material is crystalline in nature.

With respect to the particular apparatus of FIG. 2, as well as the prior art teaching of U.S. Pat. No. 4,227,234, one specific method of obtaining axial compressive stress where there is an inner element upon which the outer element is deposited, is to apply stress or tension to the inner element, deposit the outer element and solidify thereon while the inner element has stress applied thereto, adhere the outer element firmly to the inner element and then release the stress or tension previously applied to the inner element. To that end, the apparatus of FIG. 2, includes a pair of tension rollers 24, and optionally a magnetic torque brake or friction bearing 26 mounted on the wire pay-out system of roll 22 for controlling the tension applied to the wire 12 as it is transported through the preform 30 and along the process direction of the coating operation. Typically, this tensioning system in operatively associated with a load cell or other monitoring device for providing an indication of tension level and for permitting feedback control.

This method for obtaining axial compression is described in more detail in U.S. Pat. No. 4,227,234, which is hereby incorporated by reference into the present invention. This patent embraces the previous state-of-the art preferred method of manufacturing a glass coated corona discharge member, comprising the steps of: applying stress or tension to the inner conductive electrode; coating the inner conductive electrode with a dielectric coating capable of being compressed; wetting the surface of the inner conductive electrode with a molten dielectric material; and releasing the stress on the inner conductive electrode after the molten dielectric has been allowed to solidify and a sufficient bond has been formed at the interface of the dielectric coating material and the inner conductive electrode, whereby the inner conductive electrode contracts, causing a compression of the outer dielectric material. In this manner, the removal of the tension or stress from the inner conductive electrode transfers the stress load to the dielectric coating material, and, when there is a good interfacial bond between the inner conductive electrode and the dielectric material, the dielectric material is forced into axial compression.

In the foregoing example, when the inner conductive electrode is placed under tension, coated with the dielectric material which becomes bonded to the inner conductive electrode following which the tension is released upon the inner conductive electrode, the compression in the dielectric material is in the direction of the longitudinal axis of the inner conductive electrode. Thus, the wire is placed under tension before being coated by the dielectric material, which, being in a molten state, flows around the wire, wets it, and cools in a stress-free state upon the wire while the wire is under tension. Thereafter, the load (tension) upon the wire is removed, and the wire attempts to contract reversibly from its state of extension. The glass or dielectric material, being bonded to the wire, is forced by the contraction of the wire into a state of compression. The composite of the glass and wire is thereby placed in a metastable equilibrium, whereby the wire is not quite relaxed to its original state prior to extension and the glass is induced into axial compression. Because of the interfacial bond or adhesion between the dielectric material and the inner conductive electrode, the stress or tension on the inner conductive electrode remains greater than the tension on the dielectric material.

It will be understood that the amount of axial compressive force induced in glass coating 14, as provided by the method described above, is determined by the force applied to the wire 12 during the glass melt coating process. In the context of corona generating electrodes as utilized in electrostatic printing applications, the amount of compression in the dielectric coating is preferably from about 4000 to about 12,000 p.s.i. (300–850 kg/cm) and optimum results are generally obtained when the dielectric coating has a compression in excess of 8,000 p.s.i. (619 kg/cm$^2$).

In accordance with the teachings of the prior art, when the described axial compression or compressive stress along axial vector 15 is present in the outer dielectric coating of the corona discharge member, there is substantial improvement in the charging characteristics of the corona discharge member such as the one described in U.S. Pat. No. 4,086,650. Among these improvements is the control of, or elimination of, static fatigue failure as well as dynamic fatigue failure. Furthermore, more uniform charge can be generated and delivered to the surface being charged. As previously noted, the present invention is directed to the modification and inducement of additional controlled predetermined stresses in the dielectric coating along the radial and hoop stress vectors which, in accordance with the present invention, have been found to further impact product life and performance, as well as product yield and manufacturing process speed, as well as overall product quality.

Thus, having determined from the prior art that it is desirable to control axial stress in a glass coated wire composite to be compressive in nature, the present invention examines the other stress vectors present in a circular configuration, namely hoop and radial stresses, and contemplates methods for advantageously controlling these stresses within a continuous manufacturing process to provide a desired result. It is well known that the three stress vectors present in the outermost cladding component of a concentric core/clad configuration cannot all be compressive, such that at least one of these stresses must be tensile, involving forces that extend away from each other along a particular stress vector. Since it is desirable to maintain axial compression, as described hereinabove, the radial and hoop stress vectors, 17 and 19, respectively, cannot also be in compression simultaneously. More importantly, since only axial forces can be induced by the application of tension or draw force on the wire during the manufacturing process, the present invention introduces a number of specific control parameters that can be varied in order to achieve the desired stress, either compressive or tensile, along the radial and hoop vectors.

Prior to discussing the specific control parameters that can be varied to induce stresses along the radial and the hoop vectors, it is noted that, in the context of dicorotron-type corona generating devices used in electrostatographic printing applications, it is desirable to generate an idealized glass-to-metal seal with less than idealized bonding strength between the coating material and the core wire. That is, as previously described, fabrication of a typical dicorotron assembly requires that a portion of the coating layer must be removed from each end of the coated wire electrode to facilitate mounting via metal crimps, as well as to provide electrical connection for an electrical biasing source or the like. Since excessive stress in glass or glass-type materials produces a fracture plane which is generally perpendicular to the direction of the tensile stress vector causing the fracture, tensile stress in the radial direction tends to produce a fracture plane circumscribing the core wire at the interface therebetween such that the described assembly process can be optimized. Similarly, it can be shown that tensile stress in the dielectric coating along the hoop direction results in the propagation of a wedge-shaped crack for a long distance from the initial fracture site, affecting a significant dimension of the corona generating device. A fracture in the axial direction will typically remain localized to a ring shaped crack traverse to the axis of the electrode. Thus, since glass or ceramic coating materials typically do not break under compressive stress and more readily break under tensile stress, it is desirable to induce compressive stress along the hoop vector and tensile stress along the radial vector.

In accordance with the present invention, therefore, it has been determined that it is advantageous to induce selected radial and hoop stresses in the dielectric coating. More importantly, in accordance with the present invention, it can be shown that stresses along both the radial and hoop vectors can be induced and controlled by selecting the thermal expansion or compression characteristics of the material making up the core wire 12 relative to the thermal expansion or compression characteristics of the dielectric coating material 14. For example, by providing a core wire made of a material having a predetermined thermal contraction coefficient greater than the predetermined thermal contraction coefficient of the dielectric material coating, the amount of expansion of the core wire will be greater than the dielectric material during the heating process step, and, in turn, the amount of contraction of the core wire will be greater than the dielectric layer during the cooling process step such that tensile stress will be induced along the radial vector of the coated wire composite. This combination of thermal contraction coefficients also results in a compressive stress along the hoop vector. Conversely, it will be understood that by providing a core wire comprising a material having a predetermined thermal contraction less than the predetermined thermal contraction coefficient of the dielectric material, the amount of expansion of the dielectric layer will be greater than the wire during the heating process step, and, in turn, the amount of contraction of the dielectric layer will be greater than the wire during the cooling process step such that compressive stress will be generated along the radial vector of the coated wire composite. Thus, by providing materials having preselected thermal contraction coefficients in the manner described, a selected combination of compressive and tensile stresses can be induced along predetermined stress vectors.

It will be understood from the foregoing discussion, that the quantitative amount of stress, be it compressive or tensile, required along each stress vector in the outer coating of the wire composite is dependent upon the particular materials utilized for both the dielectric coating and the core wire, the temperature to which the elements are elevated, the relative rate at which they are cooled, as well as the amount of tension applied to the core wire during the time that molten glass is being place in contact with the core wire. The preferred and optimum stress residing in the dielectric coating along each stress vector can be selected in accordance with the specific requirements for the coated wire composite application. In addition, the preferred and optimum stress residing in the dielectric coating along each stress vector can be determined by monitoring and evaluating the life and performance of the corona discharge member having a predetermined amount of compression or tension along each stress vector. In this manner, optimum and preferred compressive or tensile stress can be determined for any given dielectric material and/or core wire utilized in producing the coated wire composite of the present invention.

The following example further defines process parameters for manufacturing exemplary corona discharge members of the type having an inner conductive electrode and an outer dielectric coating with the outer dielectric coating having selected stresses along the stress vectors thereof. It will be noted the following example does not specifically conform with the requirements for relative thermal compression coefficients set forth hereinabove. This discrepancy is due to the practical constraints associated with obtaining particular materials from preferred suppliers and the pricing thereof. In the following example, tungsten wire having a slightly lower thermal contraction coefficient than 1724 glass is utilized only because these materials have been found to be readily available in desired quantities. It will be understood that both metal wire and dielectric materials having preferred thermal contraction coefficients wherein the thermal contraction coefficient of the metal wire is greater than the thermal contraction coefficient of the dielectric coating material can be made available. The example is included merely to aid in the understanding of the invention, and variations may be made by one skilled in the art without departing from the spirit and scope of this invention.

A corona discharge member was prepared by coating an electroplated 0.004 inch tungsten wire available from Osram Sylvania Co. with a 0.0025 inch layer of a glass using a preform having an inside diameter of 0.222 inches and an outside diameter of 0.5 inches, wherein the particular glass was designated by the glass code 1724, available from Corning Inc. of Corning, N.Y. The thermal contraction coefficients for the tungsten wire and the 1724 glass are approximately $51\times10^{-7}$ cm/cm/°C., and approximately $54\times10^{-7}$ cm/cm/°C. respectively, yielding a minor tensile force in the direction of the radial stress vector, and a compressive force in the direction of the hoop stress vector. In addition, an axial compression on the order of 8,000 to 12,000 pounds/square inch (p.s.i.) was induced in the glass coating on the surface of the tungsten wire by applying approximately 1.5 to 2 lbs. of tension in the core wire during the time when molten glass was placed in contact with the tungsten filament. The resultant glass coated wire composite was placed within a support shield of a corona generating device of the type used in electrostatographic printing applications, as are well known in the art, resulting in a substantial improvement in the life of the corona discharge member having a glass coating. Moreover, by preselecting the thermal compression in the materials used to make up the coated wire composite, a significant increase in process speeds was achieved. As an example, since the thermal compression coefficient of materials is a function of temperature, the following process speeds were achieved based for selected temperature ranges.

| Speed | Ranges (°C.) | Ranges (lbs.) | Process Temperature (°C.) | Tension Applied (lbs.) |
|---|---|---|---|---|
| 3 m/min | 1075–1150° C. | 1.2–1.5 lbs. | 1150° C. | 1.5 lbs. |
| 6 m/min | 1150–1235° C. | 1.2–1.8 lbs. | 1150° C. | 1.6 lbs. |
| 9 m/min | 1235–1255° C. | 1.6–1.8 lbs. | 1250° C. | 1.7 lbs. |

In accordance with the present invention, there has been described an improved method for manufacturing a glass or otherwise coated wire composite material satisfying the aspects set forth hereinabove. The process described herein has been found to be particularly useful in the production of glass coated wire for use in dicorotron type corona generating devices utilized in electrostatographic printing systems.

The present invention, therefore, provides an improved process for manufacturing glass coated wire and a corona generating device produced thereby which fully satisfies the aspects of the invention hereinbefore set forth. While this invention has been described in conjunction with specific embodiments thereof, it will be understood that many alternatives, modifications and variations will be apparent to those skilled in the art. Accordingly, the present invention is intended to embrace all such alternatives, modifications, and variations as fall within the spirit and broad scope of the appended claims.

We claim:

1. A process for manufacturing a coated wire composite including a core wire having a coating layer of dielectric material thereon, wherein said core wire and said dielectric material are characterized by inherent thermal contraction coefficients, comprising the steps of:

providing a preform of dielectric coating material in a cylindrically tubular shape defining an inside diameter and an outside diameter and having a predetermined length;

aligning a continuous length of said core wire with the inside diameter of said preform for transporting the wire therethrough in a coaxial arrangement such that said wire enters said preform at an entrance orifice and exits said preform at an exit orifice;

applying heat to said preform for melting a portion thereof in proximity to the exit interface orifice for providing molten dielectric material thereat, whereby a portion of said molten dielectric material is caused to collapse onto said core wire and bond thereto;

cooling said molten dielectric material on said core wire to resolidify said dielectric material to form the coated wire composite including a core wire having a coating layer of dielectric material thereon; and preselecting the thermal contraction coefficient for said core wire and the thermal contraction coefficient for said dielectric material to be sufficiently different such that said heating and cooling steps generate stress vectors along a radial and hoop vector in said coating layer of dielectric material.

2. The process of claim 1, further including the steps of:

applying tension to said core wire during said heat applying step such that said core wire is under tension as said molten dielectric material bonds thereto; and releasing the tension on said core wire after said molten dielectric material has resolidified for generating a compressive stress vector in said coating layer of dielectric material along an axial direction thereof.

3. The process of claim 1, wherein said preselecting step includes selecting the thermal contraction coefficient for said core wire to be greater than the thermal contraction coefficient for said dielectric material for generating a tensile radial stress vector and a compressive hoop stress vector in said coating layer of dielectric material.

4. The process of claim 1, wherein said preselecting step includes selecting the thermal contraction coefficient for said core wire to be less than the thermal contraction coefficient for said dielectric material for generating a compressive radial stress vector and a tensile hoop stress vector in said coating layer of dielectric material.

5. The process of claim 3, wherein said core wire is selected to be comprised of Tungsten.

6. The process of claim 3, wherein said dielectric material is selected to be glass.

7. The process of claim 6, wherein said glass is selected to be glass code 1724 manufactured by Corning Glass Corporation.

8. The process of claim 1, further including the step of applying air pressure to the molten dielectric material in the proximity to the exit orifice for varying the region of contact between said core wire and said molten dielectric material.

9. The process of claim 8, wherein said air pressure applying step includes a process for applying vacuum pressure to the inside diameter of said preform for generating negative air pressure against the molten dielectric material in the proximity of the exit orifice.

10. A corona generating electrode of the type used in electrostatographic printing applications, wherein a conductive core wire is coated with a layer of dielectric material, said layer of dielectric material having predetermined stresses induced therein along the axial, radial, and hoop stress vectors thereof.

11. The corona generating electrode of claim 10, manufactured by a process comprising the steps of:

providing a preform of dielectric coating material in a cylindrically tubular shape defining an inside diameter and an outside diameter and having a predetermined length;

aligning a continuous length of said core wire with the inside diameter of said preform for transporting the wire therethrough in a coaxial arrangement such that said wire enters said preform at an entrance orifice and exits said preform at an exit orifice applying heat to said preform for melting a portion thereof in proximity to the exit orifice for providing molten dielectric material thereat, whereby a portion of said molten dielectric material is caused to collapse onto said core wire and bond thereto; and cooling said molten dielectric material on said core wire to resolidify said dielectric material to form the coated wire composite including a core wire having a coating layer of dielectric material thereon.

* * * * *